United States Patent [19]
Park

[11] Patent Number: 4,803,551
[45] Date of Patent: Feb. 7, 1989

[54] MODULE FOR USE IN RECEIVING TELETEXT SIGNAL

[75] Inventor: Chong S. Park, Kyungkeedo, Rep. of Korea

[73] Assignee: Gold Star Co. Ltd., Seoul, Rep. of Korea

[21] Appl. No.: 150,503

[22] Filed: Feb. 1, 1988

Related U.S. Application Data

[63] Continuation of Ser. No. 813,716, Dec. 27, 1985, abandoned.

[30] Foreign Application Priority Data

Dec. 31, 1984 [KR] Rep. of Korea ............... 1984-8574

[51] Int. Cl.⁴ .............................................. H04N 7/04
[52] U.S. Cl. ................................... 358/147; 358/146
[58] Field of Search ............... 358/147, 146, 142, 85, 358/903

[56] References Cited

U.S. PATENT DOCUMENTS 4,161,728 7/1979 Insam ................................. 358/147
4,380,027 4/1983 Leventer et al. ................. 358/142

FOREIGN PATENT DOCUMENTS 0114490 9/1981 Japan ................................. 358/147

OTHER PUBLICATIONS

"Microprocessor Smartens Teletext", Electronics, Sep. 1978, vol. 51, No. 20, p. 74.
Fedida et al., "Viewdata", Wireless World, May 1977, vol. 83, No. 1497, pp. 55-59.
Insam et al., "An Integrated Teletext and Viewdata Receiver", The SERT Journal, vol. 11 #9, 10/77, pp. 209-214.
Clarke, "The Application of Picture Coding Techniques to Viewdata", IEEE Transactions of Consumer Electronics, vol. CE-26, 8/50 568-577.
"Asynchronous Data Transmission System Series 2100 Vidata", Technical Data Sheet, Wegener Communications Inc., 1/83.

Primary Examiner—James J. Groody
Assistant Examiner—David E. Harvey
Attorney, Agent, or Firm—Birch, Stewart, Kolasch & Birch

[57] ABSTRACT

A compact module for receiving teletext data contained in a composite video signal is usable with a personal computer or a videotex decoder system. The module includes a data selector for separating teletext data from the video signal, a receiver for checking data transmission errors and comparing the addresses of received data with preselected addresses of specific data requested by a user. The module also includes a cental processing unit for processing the data produced by the receiver, which is then transmitted to the personal computer or videotex system through an input/output interface, to be displayed.

2 Claims, 4 Drawing Sheets

MODULE FOR USE IN RECEIVING TELETEXT SIGNAL

This application is a continuation of application Ser. No. 813,716 filed on Dec. 27, 1985, now abandoned.

BACKGROUND OF THE INVENTION

1. Field of the invention

The present invention relates, in general, to a module for use in receiving teletext signals and, in particular, to a module for use in receiving teletext signals by being connected with a microcomputer or a videotex (still picture) system.

2. Description of the prior art

In the prior art, there is known a teletext adaptor composed of a data selector which separates the teletext data from input composite video signals, a data receiver which compares the teletext data with page address data to determine if there are errors in the received data, a CPU, a RAM used as an input/output buffer and a screen memory, a display controller, a keyboard interface and a keyboard. There is also known a videotex decoder comprising a bidirectional modem, an input/output port and a display controller. Thus, the videotex decoder comprises almost the same elements as those comprised by the teletext adaptor, that is, a CPU, a ROM, a RAM, a keyboard interface, a keyboard and a display controller. Accordingly, it is uneconomical to purchase a teletext adaptor in case one already has a videotex decoder or a personal computer.

One example of the prior art is found in Japanese patent publication No. 57-3268 issued on Jan. 20, 1982, in which a still picture receiving circuit equipped with the aforesaid adaptor element is described. The still picture receiving circuit described in the Japanese patent publication No. 57-3268 is characterized in that a vertical retrace interval of a television signal is used for insertion of a character broadcasting signal or a still picture signal and an interval during which the wanted multiinformation signal is received at the receiving side is displayed on the screen of the television set in order that the user may recognize the time during which the wanted information signal is displayed. However, the elements comprised in the said prior art are almost same as those comprised in the prior teletext adaptor. Another one of the prior art devices is disclosed in U.S. Pat. No. 3,757,225. The elements contained therein are almost same as those in the abovementioned art, namely, a bidirectional modem, an input/output port, a CPU, a ROM, a keyboard, a keyboard interface and a display controller. Hence, if the user purchases a teletext adaptor when he already has a videotex decoder or a personal computer, many of the components will be duplicated unnecessarily resulting in extra costs.

The present invention aims to provide a module for receiving teletext signals so that it may be used as a teletext adaptor for a personal computer.

Further, the present invention aims to provide a module for use in receiving teletext signals and for use by being connected with a videotex decoder so that expensive components need not be purchased twice.

SUMMARY OF THE INVENTION

The present invention relates to a module for use in receiving teletext signals and for use by being connected with a videotex decoder composed of a data selector which selects teletext signals from among input composite video signals, a data receiver which receives the selected signals from the data selector and checks errors and page address, a CPU, a ROM, a RAM and an input/output apparatus. Thus, a module for use in receiving teletext signals according to the present economical invention can be used in place of a prior teletext adaptor. The present invention may also be used together with a personal computer.

Other features and advantages of the present invention will become apparent from the accompanying drawings executed in conjunction with the detailed description of the presently preferred embodiment thereof.

DETAILED DESCRIPTION OF THE INVENTION

Figure 1A:
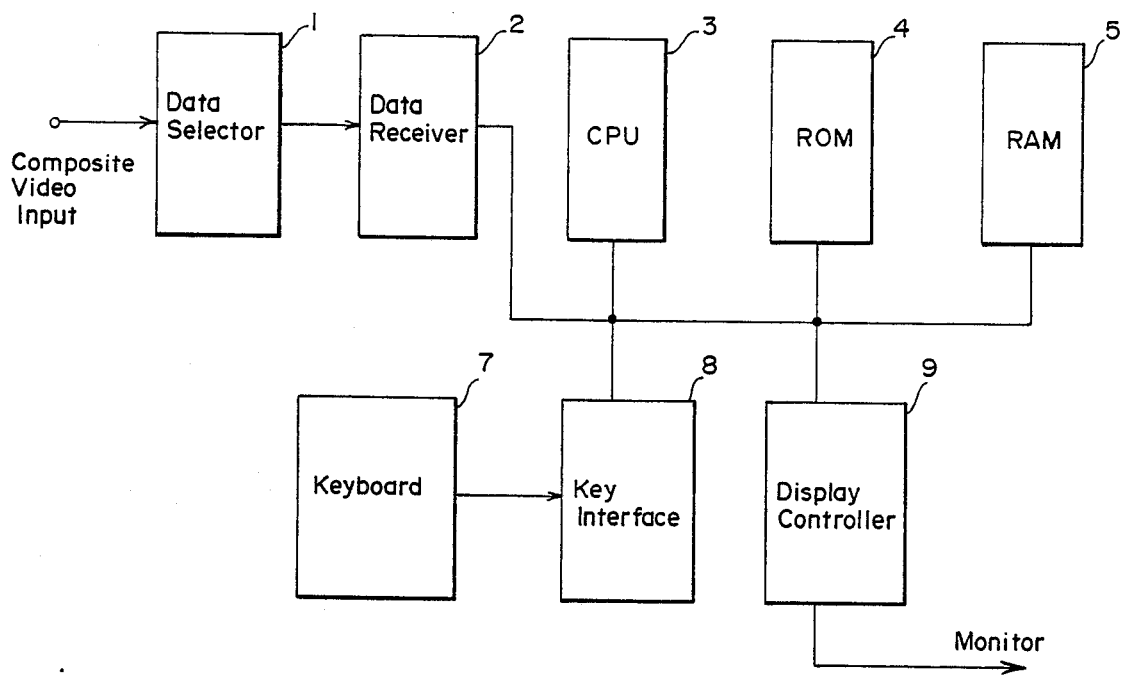
FIG. 1A is a block diagram of the prior art teletext adaptor.
Figure 1B:
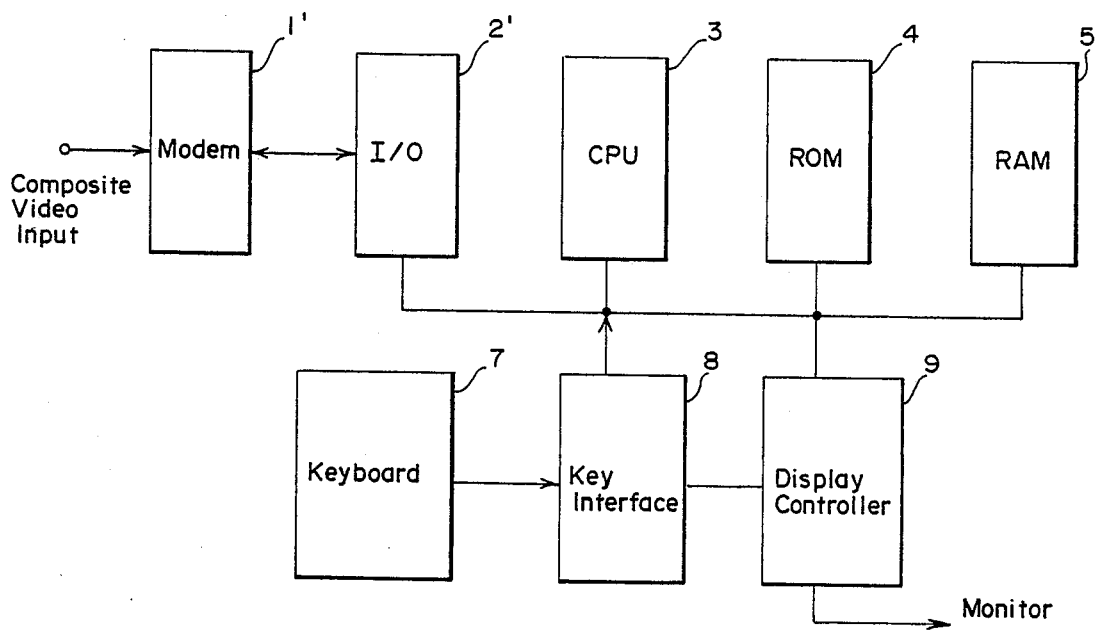
FIG. 1B is a block diagram of the prior art videotex decoder.
Figure 1C:
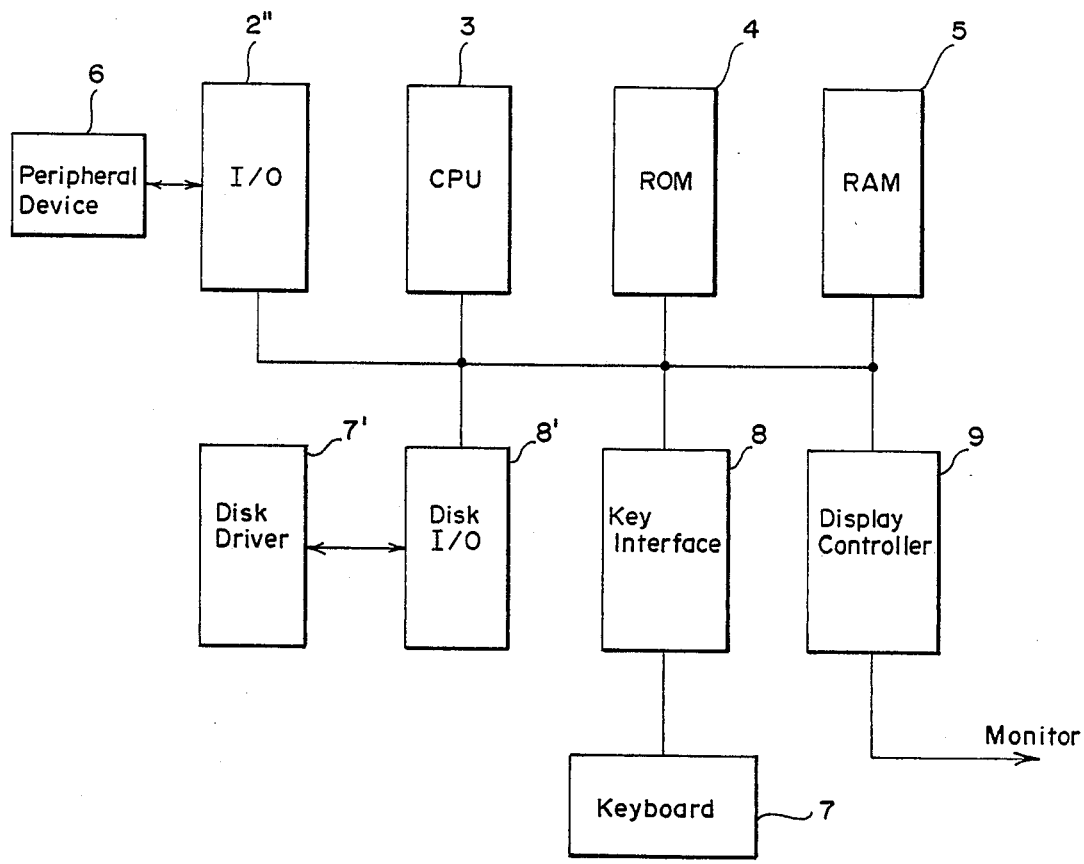
FIG. 1C is a block diagram of the prior art microcomputer.

FIGS. 1A, 1B and 1C show the structure of the prior art. The prior teletext adaptor as shown in FIG. 1A is comprised of a data selector(1) which separates teletext data from input composite video signals, a data receiver 2 which compares the separates teletext data with page address data to determine if there are errors in the received teletext data, a CPU 3 which processes the teletext data by means of a program stored in ROM(4), a RAM 5 which is used as an input/output buffer and/or a screen memory, a display controller(9) which outputs a processed results for display on the monitor, a keyboard(7) which can be used to obtain the teletext data wanted by the user and a keyboard interface(8) which transmits instructions from the user to CPU(3) through keyboard(7).

FIG. 1B shows a videotex decoder and FIG. 1C a computer. When the videotex decoder shown in FIG. 1B and the computer in FIG. 1C are compared with the teletext adaptor, of FIG. 1A it is found that their structures are almost identical and each has the same portions. If a user purchases a teletext adaptor when he already has a videotex or a computer, he will have duplicated parts, namely, a keyboard, a display controller, a keyboard interface and so forth.

Figure 2:
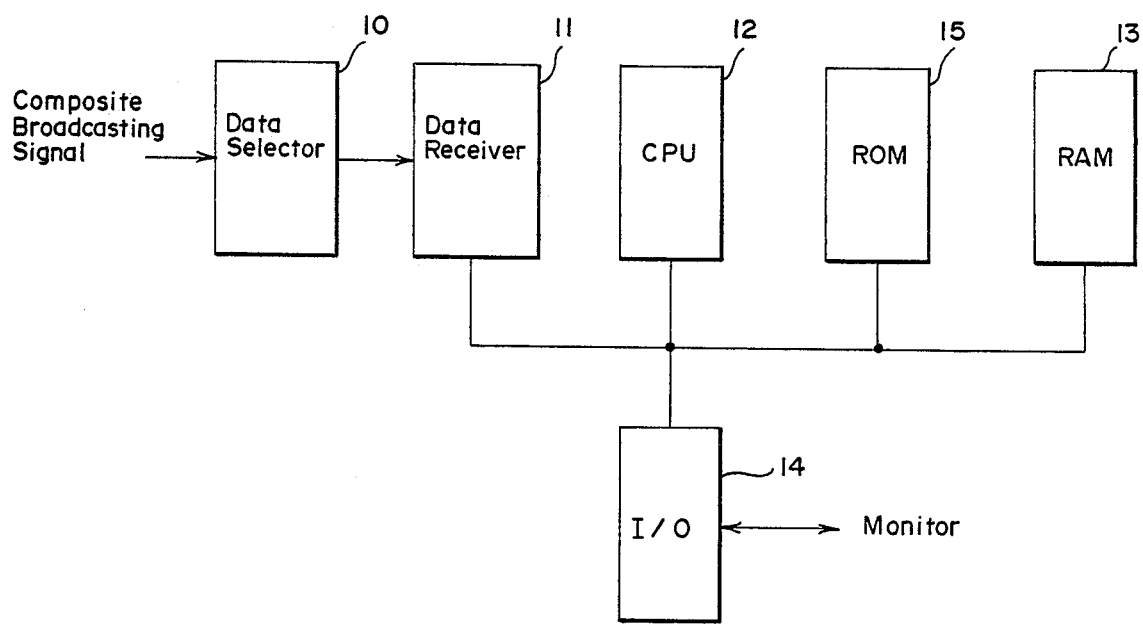
FIG. 2 is a block diagram of a module for use in receiving teletext signals of the present invention.

FIG. 2 shows a teletext module comprising a data selector(10) which selects the teletext data from input composite video signals having an audio signal, a data receiver (11) which receives the selected teletext data, checks errors and page address and outputs resultant signals to a RAM(13) by the operation of a CPU(12) according to a program stored in a ROM(15), and an input/output port(14) which outputs the teletext data and inputs the selected signals from the user and then passes the selected signals to data receiver(11). Video input signals inputted to the composite input terminal(-Vin) of the teletext receiving module are divided into a teletext data signal and a general video signal by the data selector(10). The page address desired by the user is compared with the page address of the presently inputted data in the data receiver(11). When the two page addresses are the same, the data receiver(11) passes the received data to CPU(12) after checking for errors. The CPU(12) stores in RAM(13) the data processed according to a program stored in ROM(15) and continues its operation until all the data covering one page is transmitted. The data stored in RAM(13) in such a manner is transmitted to the microcomputer or videotex decoder as shown in FIGS. 1A and 1B through input/output interface upon instructions from CPU(12). The mode of transmission from input/output interface(14) are made to comply with the rules of the input terminal(RS232C), it is because an input/output device of most microcomputers or videotexes has the characteristics of input terminal(RS232C).

When the module for use in receiving teletext signals according to the present invention is connected to the videotex decoder as shown in FIG. 1B, the data transmitted through input/output interface(14) is received by the input/output ports of the videotex decoder. As the data so received is of the same type as the videotex data received from the composite data signal input, CPU(3) processes the received data in the same way as for the videotex data and supplies the processed data to a monitor through display controller(9). The page information selected by the user is inputted to the videotex decoder through keyboard(7) and then transmitted to the data receiving device(11) through the input/output ports(2') of the videotex decoder and the input/output apparatus(14) of the teletext module for separation of page data wanted by the user from the received teletext data.

On the other hand, when the teletext module as shown in FIG. 2 is connected to the microcomputer as shown is FIG. 1C, it operates in the following manner.

As the input/output interface (2'') of the microcomputer which is connected with a peripheral device 6, such as a printer or a modem, is made to comply with the rules of input terminal (RS232C), the input/output interface(14) of the teletext module as shown in FIG. 2 can supply and receive microcomputer signals without modification. The data received through the input/output ports(2'') is processed by CPU(3), the processing program being stored in a diskette in disk driver(7'). This program is used in CPU(3) after being stored in RAM(5) through disk input/output interface(8'). The processed teletext data is displayed on the monitor through display controller(9). The page information wanted by the user is transmitted to the teletext module through keyboard(7), keyboard interface(8) and input/output ports(2'').

Figure 3:
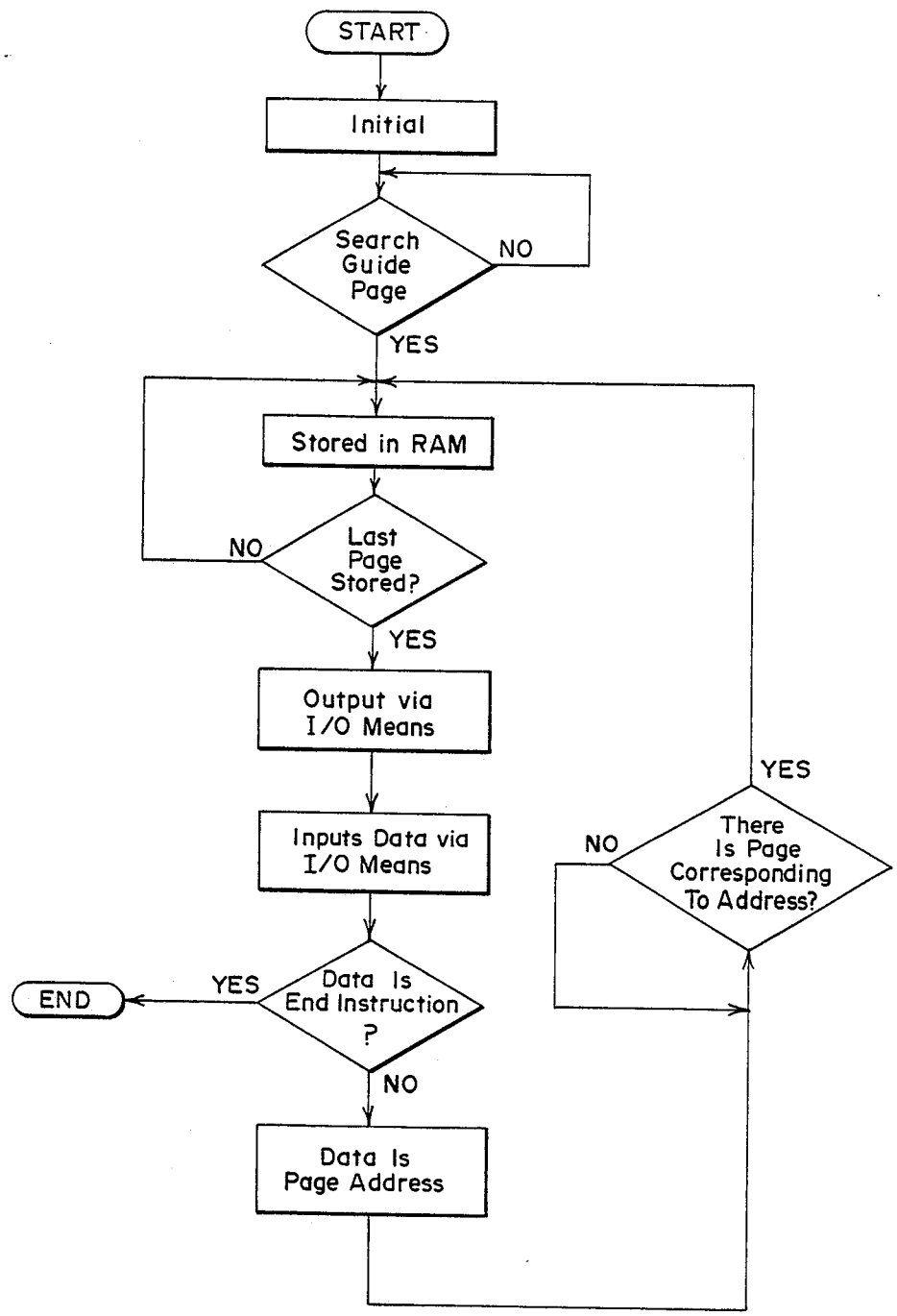
FIG. 3 is a flow chart showing the operation of a module of the present invention.

FIG. 3 is a flow chart showing the operation of the present invention. It describes an outline of the program stored in ROM(15). When it starts operation, CPU(12) gets reset and initialized. At this time, each register and memory in the data receiving device(11) are reset and the Baud rate of input/output interface(14) is adjusted for the storage of various instructions necessary for normal operation in each register by sending them to the input/output interface(14). Then, a desired guide page is searched from among the data being received from data receiving device(11). If it is searched out, the contents thereof are stored in RAM(13). When all the contents are stored, they are outputted to the serial connector of RS-232C through the input/output interface. The microcomputer or videotex decoder (FIG. 1B) provided with this data processes it as per presentation layout specifications and displays it on the screen of a monitor or TV set. At this time, if the user requires the next page information, he inputs the page selection information to the input/output interface(14) through the keyboard(7) of microcomputer or videotex decoder. The contents thereof are inputted through input/output interface(14) and stored in the data receiving device(11) as a page address to search out the page corresponding to the above page address. Then, the contents of the page searched out is stored in RAM(13) for output through input/output interface (14). The operation described hereinabove is repeatable pending instructions from the user for ending the operation through keyboard(7).

Figure 4:
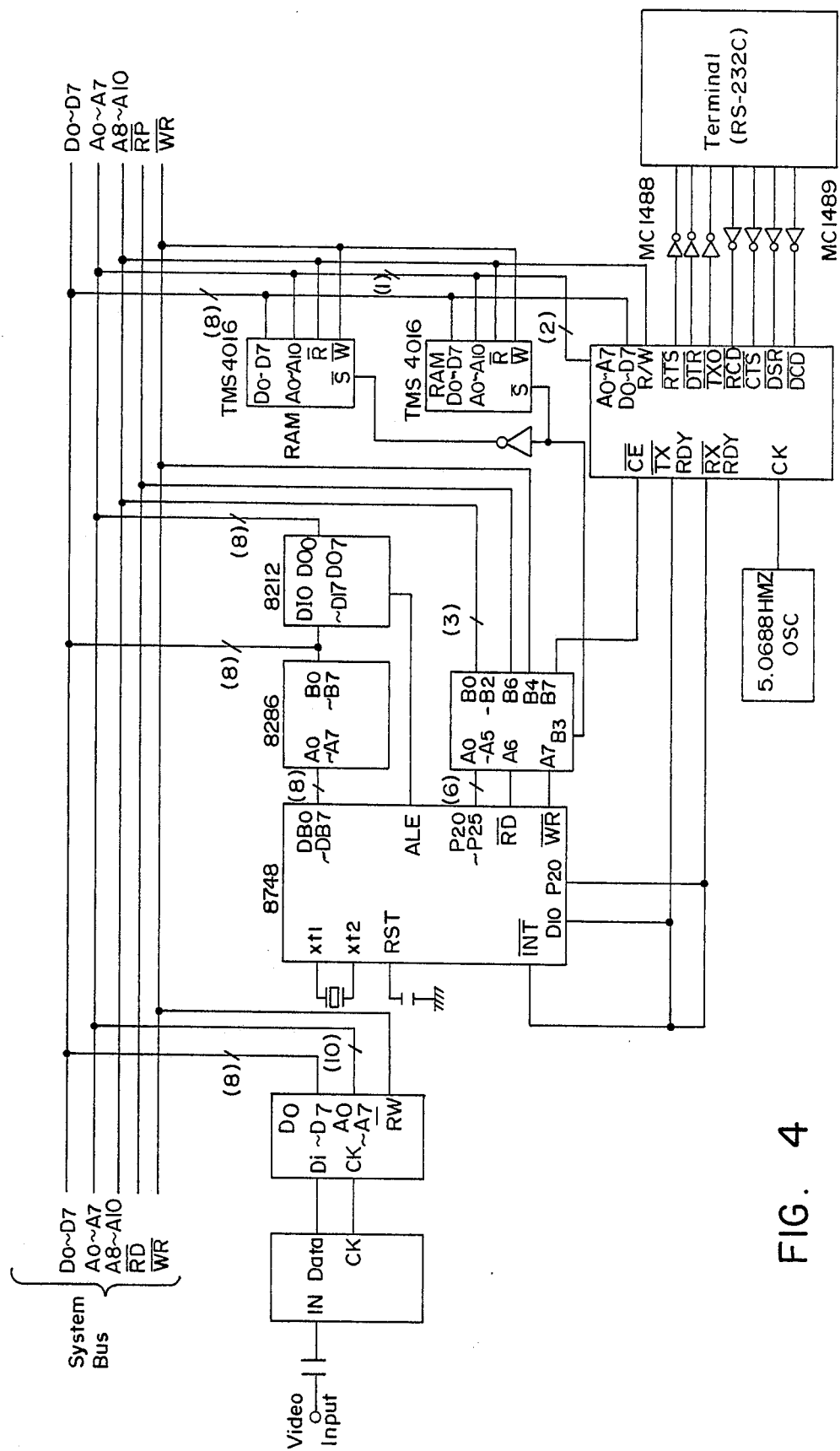
FIG. 4 is an embodiment of FIG. 2 of the present invention.

FIG. 4 shows the detailed circuit of the present invention. An explanation is given to FIG. 4 in comparison with FIG. 2, is as follows:

The data selector(10) is composed of integrated circuit elements(SL9100). Its input signals are composite video signals and its output signals are serial data and clock signals. These signals are inputted to the integrated circuit element(MR9710) which acts as a data receiving device(11), where they are converted into parallel data and connected to data bus($D_0$–$D_7$). An address signal(A0–A9) and a read/write signal from the integrated circuit element (MR9710) are used to input page selecting information to the memory and register.

One chip microprocessor(8748) consists of CPU(14) and ROM(15). The IC element(8286) connected to the microprocessor (8748) is s bidirectional bus driver and a driving element (8212) is used to divide the data and address information connected to the terminal (DB0–DB7) of microprocessor(8748). RAM(13) consists of the two IC elements (TMS4016) and has the capacity of 4 kbyte to be sufficient as one page buffer. In order to address the RAM(13) of 4 Kbyte, at least 12 address lines are required. These 12 lines are composed of 8 terminals (DB0–DB7) of the first IC element(TMS4016) and 4 terminals(P20–P23) of the second IC element(TMS4016). The input/output apparatus(14) is made of IC element(8251). As the present embodiment employs an asynchronous communication method, the terminal(RS232C) is not connected with any transmitting clock signal and receiving clock signal. The condition of IC element (8251) as a transmitting buffer or receiving buffer appears on the terminals ($\overline{TxRDY}$ and $\overline{RxRDY}$) and its signals are processed as a stop signal in the CPU(12). As the output of IC element(8251) is TTL level, IC elements (MC1488 and MC1489) are used to convert it into a terminal level(RS232C).

While the present invention is described in some detail and in one embodiment, it will be apparent to those skilled in the art that various changes and modifications can be made without departing from the spirit of the invention. Therefore, the invention should not be limited by the description made above but only by the claims which follow.

What is claimed is:

1. A module for receiving teletext data contained in a composite video signal, for use with a personal computer or a videotex decoder system, comprising:

data selector means for separating said teletext data from said composite video signal;

data receiver means for receiving said teletext data from said data selector means, checking said teletext data for the existence of errors, comparing an address of said teletext data with a preselected address stored in said data receiver means, and outputting teletext data with an address corresponding to said preselected address;

processing means for processing said teletext data outputted by said data receiver means; and input/output interface means, connectable to said personal computer or said videotex system, for outputting said processed teletext data for display by said personal computer or videotex system, and for inputting said preselected address to said data receiver means from a keyboard of said personal computer or said videotex system.

2. The module of claim 1, wherein said processing means includes a central processing unit (CPU), a ROM for storing program instructions, and a RAM for storing said processed teletext data.

* * * * *